G. H. DAY.
EYE PROTECTOR.
APPLICATION FILED DEC. 28, 1914.
1,142,313.
Patented June 8, 1915.
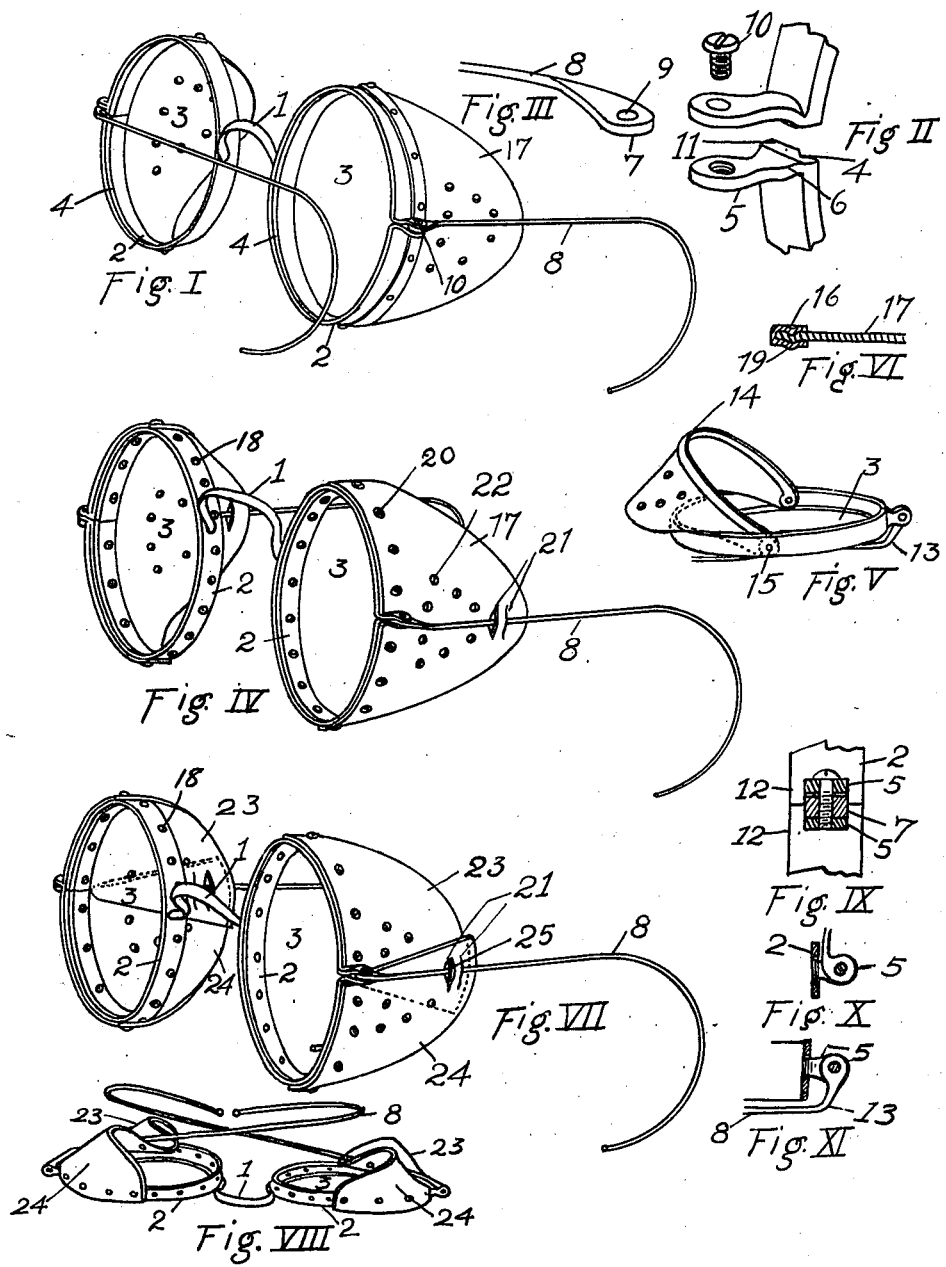
WITNESSES:
Joseph J. Demers
Edith M. Halvorsen
INVENTOR
GEORGE H. DAY
BY
H. H. Stytt  H. K. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

EYE-PROTECTOR.

1,142,313.   Specification of Letters Patent.   Patented June 8, 1915.

Application filed December 28, 1914. Serial No. 879,304.

*To all whom it may concern:*

Be it known that I, GEORGE H. DAY, a citizen of the United States, residing at Southbridge, in the county of Worcester and State of Massachusetts, have invented certain new and useful Improvements in Eye-Protectors, of which the following is a specification.

This invention relates to improvements in eye protectors, and has particular reference to a light, inexpensive and durable construction which shall be of minimum weight and which may be readily folded into small space when not in use.

One of the objects of this invention is the provision of a simple and efficient method of satisfactorily uniting the end of the lens frame which serves to secure the lenses in position.

A further object of the invention is the provision of an improved construction of flexible shield for use on a goggle of this type.

A still further object of the invention is the provision of a flexible folding shield which shall be so constructed as to automatically adapt itself to varying facial configurations.

Another object of the invention is the provision of a one-piece frame and end piece in which the parts shall be so constructed as to permit of ready movement of the temple or retaining device for the protector, while at the same time securely holding the lens in position within the frame.

Other objects and advantages of this improved construction should be readily apparent by reference to the following description taken in connection with the accompanying drawing, and it will be understood that I may make any modification in the specific details of construction shown and described within the scope of the appended claims without departing from or exceeding the spirit of this invention.

Figure I represents a perspective view illustrating one form of eye protector. Fig. II represents an enlarged detail view of the end piece. Fig. III represents a similar fragmentary view of the portion of the temple to be engaged in said end piece. Fig. IV represents a view similar to Fig. I of a slightly modified construction. Fig. V illustrates a view of the shield employed in Fig. I. Fig. VI represents a fragmentary sectional view illustrating the manner of securing the flexible portion of the shield within its frame. Fig. VII represents a perspective view of the automatically adjustable shield. Fig. VIII represents a view of the same in folded position. Fig. IX represents a detail view of the end piece construction shown in Fig. VII. Fig. X represents a fragmentary plan view thereof with the temple in operative position, and Fig. XI represents a similar view with the temple in folded position.

In the drawings, in which similar characters of reference are employed to denote corresponding parts throughout the several views, the numeral 1 designates the bridge having secured at each end thereof the frame strip 2 for retaining in position the lens 3. That form of frame strip shown in Fig. I for example, comprises merely a piece of flat material having died out in the inner face thereof adjacent one edge a groove 4 for the edge of the lens, and being provided at its outer edge with a suitable end piece for securing the ends together to retain the lens within the groove 4. One form which this end piece may take has been illustrated in Fig. II, and another form in Fig. IX. In that form shown in Fig. II, the material of the rim 2 has been bent back on itself to provide the pair of ears 5 offset from the end of the ring as indicated at 6, whereby sufficient space is provided between the ears 5 to receive the end 7 of the temple 8, said end preferably being simply flattened and rounded slightly and formed with an aperture 9 to receive the pivot rivet or screw 10, which serves to simultaneously secure the two ears together with the end 11 of the ring in tight engagement and also to retain between said ears the temple end 7.

In that form of end piece illustrated in Figs. IX to XI, in place of the ears being reversely bent with the offset 6, the ears are cut from the central portion of the material of the frame 2 leaving the tongues 12 at each side thereof, the said tongues coming into tight engagement with each other, as indicated in Fig. IX, and holding the ears sufficiently spaced to provide a free bearing for the end 7 of the temple. These ears, as shown in Fig. X, project outwardly somewhat of the frame 2, while the temple is provided with a right angle bend, as at 13, causing the temple when in open position to rest against the frame and have its opening movement limited thereby, while the position of the bend is such that when the temples are swung around through an arc of about 270 degrees they will lie flat across the face of the lenses, as is clearly indicated in Fig. XI.

In Fig. I, I have shown one of my improved flexible screen members as pivotally secured to each of the lens frames 2. Fig. I indicates the screen member as disposed exteriorly of the frame 2, but if preferred it may be pivoted on the inside thereof, as indicated in Fig. V for example. This pivoting of the shield interiorly of the lens frame is of particular advantage in case these protectors are to be employed by workmen or the like, in that the metal portion of the shield fitting within the frame 2 serves to engage the inner face of the lens 3 and thus to act as a sort of buffer or brace tending to prevent any flying of the particles in the event that the lens itself is shattered by a blow against the outer face thereof. By reference to Fig. VI, the inexpensive nature of the construction of this shield member should be readily apparent, and it will be seen that the metal frame comprises merely a U-shaped or channel strip of material 14 having apertured at its ends to receive the pivots 15 and having a plurality of indentations 16 formed in one or both sides thereof to supplement the pinching together of the channel section and securely lock the flexible shield member 17 of leather or other suitable material in position.

If desired to attain maximum ventilation and lightness of the frame 2 there may be formed therein the plurality of apertures 18, while the indentations 16 may be pressed through the channel member to produce the bosses 19, whereby when the shield frame is swung into open position the bosses 19 will spring into certain of the apertures 18 and thus lock the shield members against accidental closing while permitting of swinging of the complete shield into closed position as desired.

In Fig. IV, I have illustrated a different form of my construction in which the flexible shield member in place of being pivoted to the frame 2, as in the form just described, is secured thereto as by a plurality of eyelets or rivets 20 passing through the frame 2 and the flexible shield portion 17, to permanently unite the parts. In this form to facilitate folding, I preferably form in the shield near the rearmost end thereof a pair of slots 21 through which the temple 8 may be passed to connect the parts to fold or open out together, the shield being also provided with a plurality of ventilation apertures 22 to permit of free circulation of air therewithin.

In Figs. VII and VIII, I have shown a still further modification of my idea and one which, so far as I am aware, is entirely novel in the eye protecting art. This consists in forming the shield member in sections having an over-lapping or telescopic relation and so connecting the parts that they may automatically adjust themselves according to the facial requirements of the individual wearer. In the use of an eye protector it is quite desirable that the same properly and yet comfortably fit the face, as closely as possible, a result quite difficult of attainment with metal and other rigid constructions on account of the great variance in shape of different faces and also a result not satisfactorily attained in all instances even where a flexible shield such as just described is employed. To overcome this difficulty and at the same time to facilitate the ready folding of the protector when not in use into the smallest possible space, in that form of my invention illustrated in Figs. VII and VIII, I have formed a shield of two portions 23 and 24 respectively, disposed to considerably overlap each other, as clearly illustrated by the dotted line in Fig. VII. Each of these sections has the slots 21 formed therethrough to provide the guide strip 25 beneath which the temple lies. These slots are of sufficient length to allow considerable relative movement of the two over-lapping parts. It will thus be seen that as the temple is moved inward into folded position the natural tendency of the two shield members will be to further over-lap, and thus facilitate their being drawn in a much flatter position. On the other hand, as the temples are moved outwardly into open position they will constantly increase the size of the shield. As a result, when the mounting is worn by a person with comparatively narrow temples the inward movement of the protector temples 8 to properly fit behind the ears will close up the shield into satisfactory engagement with the side of the face. On the other hand, if a person with a wider head desires to wear the same protector the outward swinging of the temples to accommodate the size of this person's head will cause an opening up of the shield and consequently the shield will fit much more satisfactorily and securely against the face than would be the case were a shield of fixed or predetermined size employed.

From the foregoing description taken in connection with the accompanying drawings, the construction and advantages of my improved eye protector should be readily apparent, and it will be seen that in all instances I have provided an extremely simple, efficient and inexpensive construction which may be produced at a minimum cost compatible with the maximum of protection attained by my construction. It will further be noted that the flexible shield members while of inexpensive construction, perform the desired function to the greatest possible degree, are secured in a new and novel manner, and in the form illustrated in Figs. VII and VIII attain a result hitherto unaccomplished by anything in the art.

What I, therefore, claim and desire to secure by Letters Patent is:

1. A frame for an eye protector, comprising a strip of material interiorly grooved to receive a lens, said strip having ears at the termini thereof offset inwardly of the said termini, whereby when the ears are secured to hold the termini in tight engagement a space is provided in which to pivot a temple, substantially as described.

2. In a device of the character described, the combination with a main frame, of a metal channel member secured thereto, said channel member having a flexible shield member disposed within the groove thereof, the material of the channel being indented to bite into the flexible shield and securely retain the same in position.

3. The combination with a lens frame having a plurality of apertures formed therein, of a shield member pivoted to the frame, and having a plurality of indentations formed in the outer face thereof to produce bosses on the inner surface, whereby when the shield is swung into open position the bosses may be snapped into the apertures in the frame to lock the shield in adjusted position, substantially as described.

4. In an eye protector, the combination with a lens retaining frame, of a pair of flexible shield members secured to the frame and having their adjacent portions overlapped, whereby the shield as an entirety may accommodate itself to varying facial configurations while preserving its unity as a protecting medium.

5. In an eye protector, the combination with a lens retaining frame, of flexible shield members secured to the frame in over-lapped relation, a temple carried by the frame and connections between the temple and the shield members whereby the relative position of the shield members is varied by movement of the temple into operative position, substantially as described.

6. In an eye protector, a frame therefor, comprising a strip of material having an ear cut centrally from each end thereof to provide a tongue on each side of the ear, whereby when the tongues of the two ends are brought into tight engagement the ears will be held in spaced relation, substantially as described.

7. In an eye protector, the combination with a lens engaging frame, of a sectional shield member secured to the frame, and means for holding the sections of the shield in over-lapping relation while permitting of their relative movement to adjust themselves to individual facial requirements.

In testimony whereof I affix my signature in presence of two witnesses.

GEORGE H. DAY.

Witnesses:
H. K. PARSONS,
E. M. HALVORSEN.